C. SCHUETZ.
Ornamental Chains.
No. 147,983.  Patented Feb. 24, 1874.
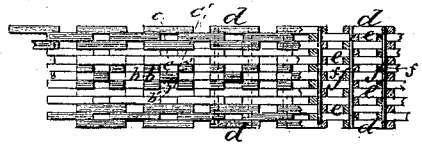
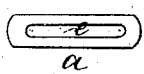 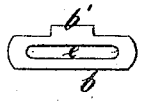 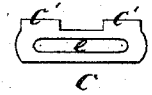 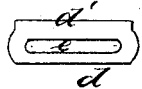

UNITED STATES PATENT OFFICE.

CHARLES SCHUETZ, OF NEWARK, NEW JERSEY.

IMPROVEMENT IN ORNAMENTAL CHAINS.

Specification forming part of Letters Patent No. 147,983, dated February 24, 1874; application filed February 12, 1874.

*To all whom it may concern:*

Be it known that I, CHARLES SCHUETZ, of Newark, in the county of Essex and State of New Jersey, have invented a new and useful Improvement in Ornamental Chains; and I do hereby declare the following to be a full, clear, and exact description thereof, which will enable those skilled in the art to make and use the same, reference being had to the accompanying drawing forming part of this specification, in which drawing—

Figure 1 represents a plan of my chain partly in section. Figs. 2, 3, 4, and 5 are detached views of the several links used in the construction of my chain in a larger scale than the previous figure.

Similar letters indicate corresponding parts.

This invention consists in a chain composed of slotted links with raised projections joined by transverse wires, which are soldered to the outer links, the projections on the links being made to form ornamental raised and sunken surfaces, which may be arranged to show designs or characters of various kind.

In the drawing, the letters $a$ $b$ $c$ $d$ represent the various links from which my chain is made. These links are either cast or punched of gold or any other suitable metal, each link being provided with an oblong slot, $e$, for the reception of the transverse connecting-pins, $f$. The links $b$, $c$, and $d$ are provided with raised projections $b'$ $c'$ $d'$ of various form and position, while the links $a$ may be plain, as shown. Previous to connecting the links together a number of links of the same kind are placed upon a flat mandrel, which fits the slots $e$, and are finished together.

The raised surfaces of the projections are, by preference, ground and polished after the links have been connected together by the transverse pins, and thus the sunken surfaces of the chain will be dull, and the raised surfaces polished, and thereby a good effect is produced. The outer links, or all of them, may have two round or oblong holes instead of one long slot.

The projections on the links $b$ $c$ $d$ may be so formed, and the various links arranged in such relation to each other, that, when the chain is completed, the polished surfaces of the projections produce characters or designs of different kinds, and thereby a chain of highly ornamental character can be produced with comparatively little trouble and expense, and without requiring great skill in combining the links. The transverse connecting-pins $f$ are soldered to the outer links, while the intermediate links are free to play or turn on said pins, and by these means a chain produced, as above described, obtains a high degree of flexibility, and it is obvious that my chains can be made of any desired width, so that they can be used with advantage for watch-chains, or for bracelets, or for necklaces, or for ornamental chains of any desired character.

What I claim as new, and desire to secure by Letters Patent, is—

An ornamental chain composed of slotted links with raised projections joined by transverse wires, which are soldered to the outer links, the projections on the links being made to form ornamental raised and sunken surfaces, all substantially as shown and described, and for the purpose set forth.

CHARLES SCHUETZ.

Witnesses:
 W. HAUFF,
 E. F. KASTENHUBER.